United States Patent
Brüllmann et al.

(10) Patent No.: US 11,932,502 B2
(45) Date of Patent: Mar. 19, 2024

(54) LOADING DEVICE AND PYLON FOR A LOADING DEVICE

(71) Applicant: Bühler AG, Uzwil (CH)

(72) Inventors: Adrian Brüllmann, Zihlschlacht (CH); Bogoljub Kostic, Uzwil (CH)

(73) Assignee: Buhler AG, Uzwil (CH)

( * ) Notice: Subject to any disclaimer, the term of this patent is extended or adjusted under 35 U.S.C. 154(b) by 131 days.

(21) Appl. No.: 17/595,170

(22) PCT Filed: Jun. 16, 2020

(86) PCT No.: PCT/EP2020/066592
§ 371 (c)(1),
(2) Date: Nov. 10, 2021

(87) PCT Pub. No.: WO2021/018462
PCT Pub. Date: Feb. 4, 2021

(65) Prior Publication Data
US 2022/0194721 A1    Jun. 23, 2022

(30) Foreign Application Priority Data
Jul. 29, 2019  (EP) .................... 19188762

(51) Int. Cl.
*B66C 23/74* (2006.01)
*B65G 67/60* (2006.01)
*B66C 23/36* (2006.01)

(52) U.S. Cl.
CPC ............ *B65G 67/606* (2013.01); *B66C 23/36* (2013.01); *B66C 23/74* (2013.01); *B65G 2201/04* (2013.01)

(58) Field of Classification Search
CPC ......... B66C 23/36; B66C 23/74; B66C 23/64; B66C 23/78; B65G 67/606; B65G 2201/04; B65G 67/60; B65G 57/00; B65G 67/04
See application file for complete search history.

(56) References Cited

U.S. PATENT DOCUMENTS 9,193,571 B2 * 11/2015 Koch .................... B66C 19/002

FOREIGN PATENT DOCUMENTS

| CN | 103492294 A | | 1/2014 | |
|---|---|---|---|---|
| CN | 104003211 A | | 8/2014 | |
| CN | 203767682 | * | 8/2014 | ............ B65G 67/60 |
| CN | 203767682 U | | 8/2014 | |
| DE | 1290875 B | | 3/1969 | |
| DE | 2523948 | * | 12/1976 | ............ B65G 11/06 |
| DE | 2523948 A1 | | 12/1976 | |
| DE | 9017114 U1 | | 3/1991 | |
| SU | 827349 A1 | | 5/1981 | |

* cited by examiner

*Primary Examiner* — Lynn E Schwenning
(74) *Attorney, Agent, or Firm* — Colson Law Group

(57) ABSTRACT

The invention relates to a loading device, wherein the loading device comprises a gantry (6) and a platform (5) which is mounted on the gantry (6). A pylon (1) is arranged at a base point (7) on the platform (5). A jib extends out from the pylon (1). The pylon (1) can be rotatably connected to the platform (5). The platform (5) defines a vertical axis (8) which extends in the vertical direction and runs through the base point (7). The pylon (1) is curved in a region adjoining the platform (5) and intersects the vertical axis (8) at an angle (a). The invention further comprises a pylon (1) for a loading device.

15 Claims, 3 Drawing Sheets

LOADING DEVICE AND PYLON FOR A LOADING DEVICE

Figures 1A, 1B:
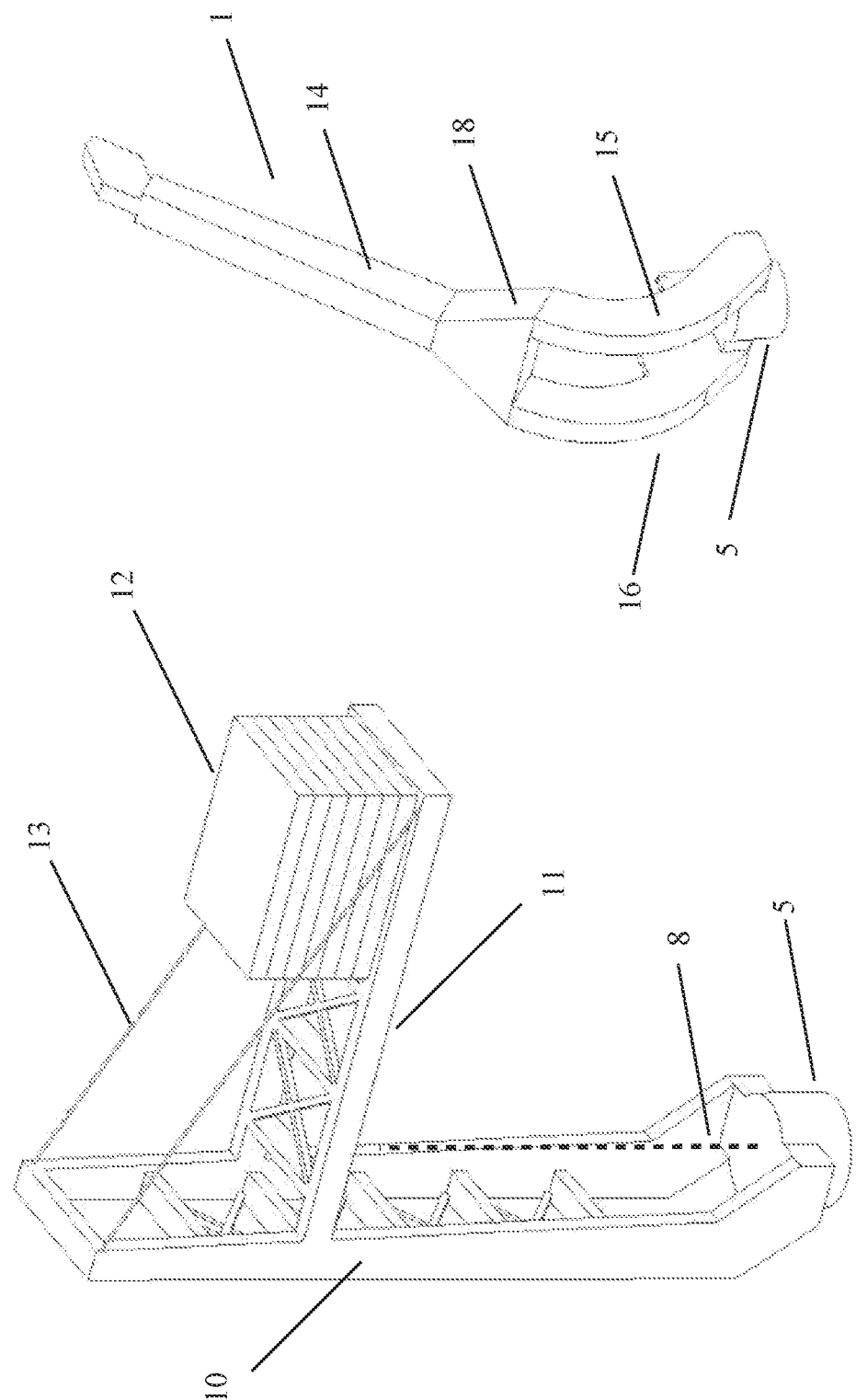

The present invention relates to a loading device and to a pylon for a loading device.

Loading devices for loads, such as, for example, piece goods or bulk goods, generally have a pylon to which jibs may be attached in order to increase the loading radius or hold counterweights. Such devices are used, for example, in mobile or static ship loaders, stackers and cranes.

In conventional systems, the pylon is generally vertical. The jibs for loading loads and for the counterweights are mounted on the pylon at an approximately 90-degree angle, wherein the jib for loading loads can often be tilted vertically. If bulk goods are loaded, the pylon must be slightly offset with respect to the axis of rotation in order to ensure space for the product supply and free rotation of the jib, since the product is generally transferred above the axis of rotation, from the belt which supplies the product and is static, to the jib which carries away the product and is generally mounted so as to be rotatable together with the pylon. In conventional systems, balancing weights or counterweights are necessary, which, in addition to the load of the jib and the equipment connected thereto, also compensate for the weight displacement caused by the offset of the pylon. Furthermore, bending loads result in large and complex structures which are expensive to manufacture and possibly vulnerable to wind and earthquakes. As a result of increasing loading capacities, the devices will become even larger in the future, as a result of which greater forces will occur at the supporting structure, in particular at force transitions.

EP 0 832 831 B1 shows a ship loader with a rotary part, which is arranged parallel to the axis of rotation on the movable gantry. The pivot point forming the connection of the jib to the rotary part of the gantry simultaneously forms the lifting and lowering axis of the jib. So that the bulk goods can be transferred between the conveyor belts when the jib is in the upper position, the rotary part must have a kink in the upper third.

EP 0 000 550 B1 discloses a ship unloader, with which the piece goods are conveyed vertically upward. A column is arranged on a rotatable platform. An unloading station has a derricking jib which is mounted rotatably relative to the column in order to enable a derricking movement relative thereto. The column is kinked once so that the conveyor belt and the connecting conveyor belt can transfer the bulk goods to a second intermediate conveyor belt. Furthermore, this kinking is necessary to produce a parallelogram of column, swivel arm, movable frame and connecting piece relative to the removal unit.

Both documents cited have a kink in the pylon, which leads to the unfavorable and high forces on the supporting structure described above and furthermore necessitates compensation in the form of counterweights due to the weight displacement far away from the pivot point.

The object of the present invention is thus to provide a loading device and a pylon for a loading device which solves the problems of the prior art.

The invention relates to a loading device, wherein the loading device comprises a gantry and a platform which is mounted on the gantry. A pylon is arranged at a base point on the platform. A jib extends out from the pylon. The pylon can be rotatably connected to the platform. The platform defines a vertical axis which extends in the vertical direction and runs through the base point. The pylon is curved at least in a region adjoining the platform and intersects the vertical axis at an angle a. Furthermore, product supply devices, in particular conveyor belts, can be provided on the loading device.

The pylon preferably has a fork, a central middle piece and counterweights, the fork being formed by two legs and a connecting bar, and the fork being curved. Preferably, the legs of the fork are curved. The jib is preferably arranged between the two legs of the pylon.

The jib can be adjustable in height. The angle a can be between 20° and 60°, preferably 30° and 50°, and particularly preferably 40° to 45°.

The center of gravity of the pylon is preferably substantially above the base point or offset from the base point in a direction opposite the jib. This direction is also referred to as "rear."

The pylon is preferably curved in one direction. The platform can be rotatable about the vertical axis. The section of the pylon remote from the base point can be straight. At least one counterweight can be mounted on the section of the pylon remote from the base point. The pylon is preferably formed from a box-shaped steel construction, for example from welded steel sheets.

The loading device can be a mobile or stationary unloader or loader for ships or a crane.

Furthermore, the invention provides a pylon for a loading device. The pylon extends from a base point and is at least partially curved. Furthermore, the pylon is curved in such a way that it intersects a vertical axis at an angle a. The vertical axis extends through the base point in the vertical direction.

The advantages and preferred embodiments described above in connection with the loading device also relate to the pylon itself.

During operation, the center of gravity of the pylon is preferably substantially above or behind the base point, i.e., in the side of the gantry facing away from the jib or ship. The pylon according to the invention can be curved over at least 10%, 20%, 25% or 50% of its longitudinal extent. The section of the pylon facing the platform is preferably curved or arcuate. The pylon is thus preferably curved starting from the base point. In particular, the section remote from the base point can be straight without any curvature. The pylon can also be completely curved or arcuate. The pylon is preferably curved only in one direction.

The pylon can be mounted on a platform rotatable about an axis of rotation, wherein the vertical axis can coincide with the axis of rotation. The base point thus lies substantially on the axis of rotation in this case. Furthermore, a jib can be mounted on the pylon. In a preferred embodiment, the pylon is forked, so that two legs are connected to the platform and these two legs together with a connecting bar form a fork which is connected to a middle piece. In this case, the jib can be mounted between the two legs. The jib can be adjustable in height. In particular, the jib can be tilted vertically about a suspension or pivot point on the pylon.

As described above, the pylon can be used in particular in a mobile or stationary loader or unloader for ships or with a crane.

The invention is explained in more detail with reference to the accompanying drawings. The following is shown FIG. 1A: A pylon according to the prior art FIG. 1B: A pylon according to the invention FIG. 2: A side view of a device for loading loads with the pylon according to the invention FIG. 3: A perspective view of a device for loading loads with the pylon according to the invention.

FIG. 1A shows a conventional ship loader with a vertical member 10 which can be mounted rotatably on a platform and on which a horizontal member 11 is mounted to accommodate counterweights 12 thereon. The vertical axis 8 leads through the platform 5. In order to allow a rotational movement of the vertical member when, for example, bulk goods are loaded, a kink is formed on the vertical member at the lower end so that the vertical member 10 is offset forward with respect to its axis of rotation. Forward denotes the direction in which the bulk goods or the loads are loaded, whereas rearward denotes the direction of the horizontal member or of the supply of bulk goods. This offset is necessary since the bulk goods to be loaded are usually transferred from a supplying conveyor belt to the removing jib above the axis of rotation 8 of the platform 5, and without this offset a collision with the supplying conveyor belt could occur when the vertical member rotates. In this case, the vertical member 10 is oriented forward, i.e., deviating from the vertical axis 8, in a lower section and then transitions via a kink into an uncurved vertical section. Thus, counterweights 12 are necessary, which are mounted at the rear end of the horizontal member in order to compensate for the imbalance occurring to the front due to the offset and for the weight of the jib with loads (not shown). In other words, the counterweights compensate for imbalances produced in particular by the devices arranged above the base plate or the platform of the vertical member 10 and by the bulk goods.

Furthermore, a diagonal guy 13 is provided from the vertical member 10 to the horizontal member 11. The vertical member 10 and the horizontal member 11 with counterweights 12 thus form a triangular construction or mutual guying. Due to this construction, in particular the components arranged at an angle to one another and abrupt changes in direction of the triangular construction, and due to the forward kink described above, very high bending loads occur at the force transitions, which necessitate complex, massive, heavy and large supporting structures. These in turn lead to a higher vulnerability to wind loading and earthquakes.

FIG. 1B shows a pylon 1 according to the invention which overcomes the disadvantages of the prior art. The pylon 1 deviates from the vertical axis 8 by a curvature or bend, which is formed starting from a base point 7 (see FIG. 2) or offset therefrom. The curvature or bend can be convex in relation to the vertical axis.

The base point 7 can lie, in particular, in the center point of a base plate of the platform 5 of the pylon 1. In this case, the base plate is understood to be the side of the platform 5 which is arranged on the gantry 6 on the vertically lower side, i.e., oriented toward the ground, during operation. The pylon 1 can be mounted rotatably or rigidly on the gantry 6 by means of the platform 5. In the case of a rotatable embodiment, it is advantageous for the vertical axis 8 (see FIG. 2) to run through the base point 7 and for the pylon thus to be rotatable about the base point 7. If the pylon 1 is rotatable, the platform 5 can be designed, for example, as a ball-bearing slewing ring. The pylon 1 is curved at least partially over its longitudinal extent. At least 10%, 20%, 25% or 50% of the pylon 1 can be curved. It can also be expedient to make the pylon 1 completely curved. Furthermore, the pylon 1 is preferably curved only in one direction, i.e., it does not have a change in direction. In particular, the pylon 1 can be substantially in the form of a hyperbola. Furthermore, the pylon 1 can have a continuous bend without an abrupt change in direction or force deflections.

The pylon 1 is preferably curved in such a way that its center of gravity 17 (without taking into account the counterweights) is located substantially above the base point 7 or at a horizontal distance x from the vertical axis 8. The distance x refers to the side of the vertical axis 8 remote from the jib 2. The distance x can thus be greater than or equal to 0. The description of the center of gravity 17 with respect to the base point 7 relates to the orientation of the pylon 1 during operation. The pylon 1 is then connected rotatably or rigidly to the gantry 6 via the base plate of the platform 5. In particular, the counterweights 3 are located at the upper end of the pylon 1, and the base point 7 is located at the vertically lower end of the pylon 1, i.e., facing the ground.

As described above with respect to the prior art, the counterweights 3 compensate for all the elements provided above the base point 7, i.e., the jib 2 and the bulk goods to be loaded or the loads. The number of counterweights 3 required can thus be reduced by the design according to the invention and the displacement of the center of gravity of the pylon 1 as a result of the curvature described.

Furthermore, the pylon 1 can be forked. For example, two legs 15 of the pylon 1 can merge into a connecting bar 18 and thus form a fork 16 and be mounted on the rotatable or rigid platform 5. A jib 2 for loading loads, such as bulk goods, can be arranged between the fork 16. As a result of the curvature of the pylon 1, a conveyor belt or another product supply 4 for supplying loads or bulk goods can be positioned above the base point 7 in the curved part. The fork 16 or the two legs 15 can open into a central middle piece 14, as shown in FIG. 1B.

Counterweights 3 can be mounted on the upper end of the pylon 1 in order to compensate for the weight of the jib 2 and the loads. The jib 2 can also be adjustable in height. This can be accomplished, for example, by means of cable winches, which can be mounted on the pylon.

Furthermore, the pylon 1 according to the invention can have a box design. Box design means that metal sheets are welded to one another so that a hollow structure is produced, whereby a high bending strength can be achieved with a low weight. This achieves very good rigidity with, at the same time, less material consumption and a reduction in area exposed to wind in comparison with conventional systems. The bending loads can be reduced by the continuous shape without abrupt force deflections. In other words, due to the curved design and the omission of the horizontal member, mainly normal and shear stresses and almost no bending occur at force transitions. This reduces the effects of force overall and thus leads to a more stable system, which can absorb even relatively large seismic loads. Furthermore, the pylon 1 can be scaled in size, so that the same design can be used, depending on the field of application, location and other parameters, such as, for example, ship size.

The pylon 1 can be used for a stationary loading device or another device for loading loads, which is permanently installed, for example, in a port. The device can be rotatable about the base point 7. If the pylon 1 is used for a mobile ship loader, the device can be mounted on a movable gantry. The gantry can be moved on rails or tires, for example. A platform for rotatably mounting the pylon 1 can be mounted on the gantry.

The overall statics are thus improved by the displacement of the center of gravity 17 in the direction of the base point 7 or the vertical axis 8. Thanks to the box profile, a very good rigidity is achieved, and the steel construction weight can be reduced. Furthermore, the pylon 1 has no abrupt transitions due to the curvature and has a continuous inclination, which leads to better absorption of the loads due to the force profiles and stress situation. Furthermore, the loads or forces on the gantry are reduced, as a result of which the size of the chassis can be reduced in movable loaders. Since the center of gravity 17 of the pylon 1 is at or close to the axis of rotation or vertical axis 8, no additional counterweights 3 are required to compensate for the mass of the pylon 1. The counterweights 3 for compensating the jib 2 can be accommodated directly on the pylon 1 itself. Overall, the mass of the counterweights 3 can thus also be reduced since the pylon 1 is inherently stable or, if the center of gravity of the pylon is behind the base point 7, generates a torque about the base point 7 in the same direction as the counterweight 3. Furthermore, the pylon 1 can also accommodate the guy of the jib 2, for example with a winch system, as well as the operator's cab.

The present invention is explained in more detail with reference to the example of a mobile or stationary ship loader for bulk goods. However, the pylon can also be used for other loading devices or devices for loading loads.

Figure 2:
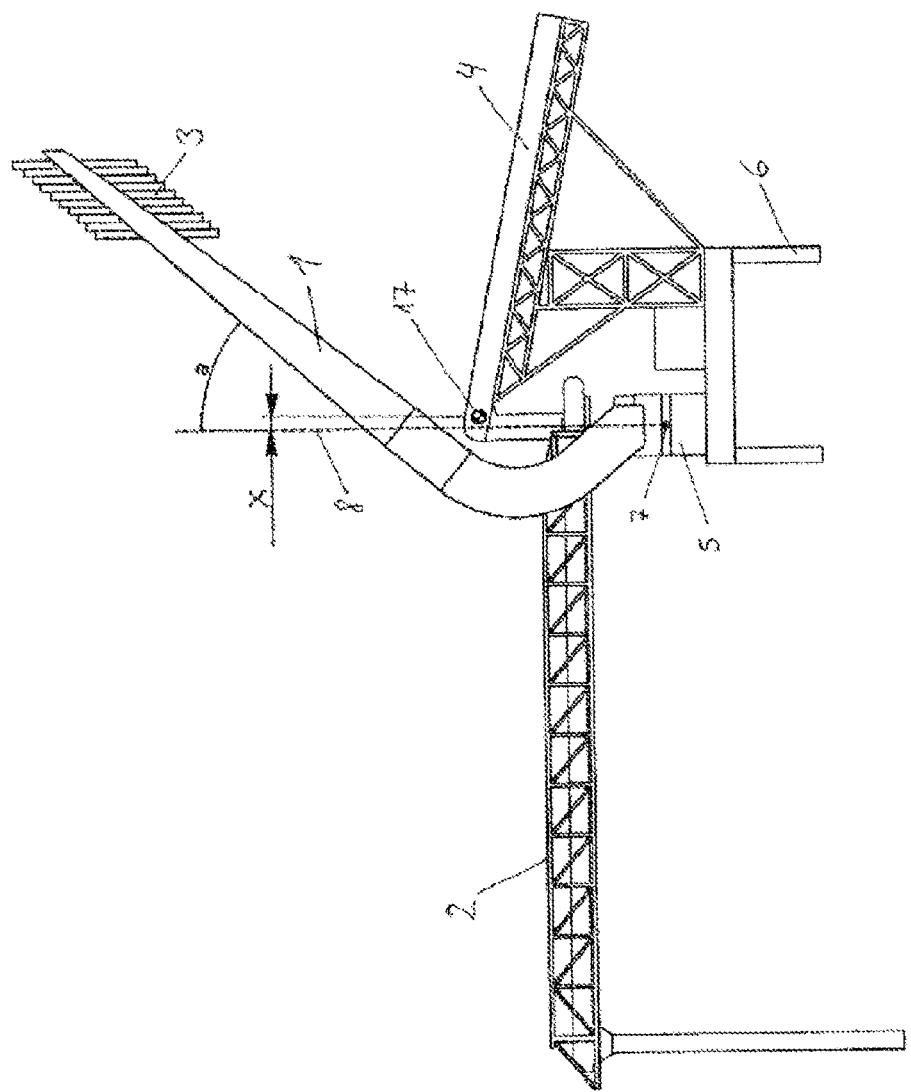

FIG. 2 shows a side view of a ship loader with the pylon 1 according to the invention. The pylon 1 is mounted in this case rotatably about the vertical axis 8 on a platform 5. In particular, the axis of rotation or vertical axis 8 runs through the base point 7 here. The bulk goods are conveyed via the product supply 4, in particular in the form of conveyor belts, to a position located approximately above the vertical axis 8 and transferred there to the jib 2. As described above, the design of the pylon 1 enables a rotational movement of the pylon 1 with jib 2 without the risk of collision with the conveyor belt 4. In order to compensate for the weight of the jib 2, counterweights 3 are mounted on the vertical end of the pylon 1. Furthermore, a pivotable device is provided at the front end of the jib 2, i.e., in the unloading direction of the product, in order to be able to load the entire ship hull. This can be designed, for example, as a kick-in kick-out system. The loading device can be moved by means of a gantry 6 on rails or tires.

In this case, the curvature starts at the bottom end of the pylon 1 and next to the gantry 6 starting from the base point 7. While conventional systems have a kink and a strictly vertical section after the kink (see FIG. 1A), a continuous curvature is formed in the pylon 1 according to the invention so that the pylon 1 is curved backward, i.e., opposite to the ship or jib 2, and thus intersects the vertical axis 8. In other words, the angle a between the direction in which the pylon extends at the intersection point and the vertical axis 8 is greater than 0°. The angle a is enclosed between the vertical axis 8 and the central middle piece 14 of the pylon 1. This angle a is preferably between 20° and 60°, more preferably between 30° and 50°, and particularly preferably the angle a is 40° to 45°. It can also be advantageous for the pylon 1 to be curved still in the region in which it intersects the vertical axis 8. In this case, the angle a between the pylon 1 and the vertical axis 8 is defined by means of a tangent to the pylon.

Figure 3:
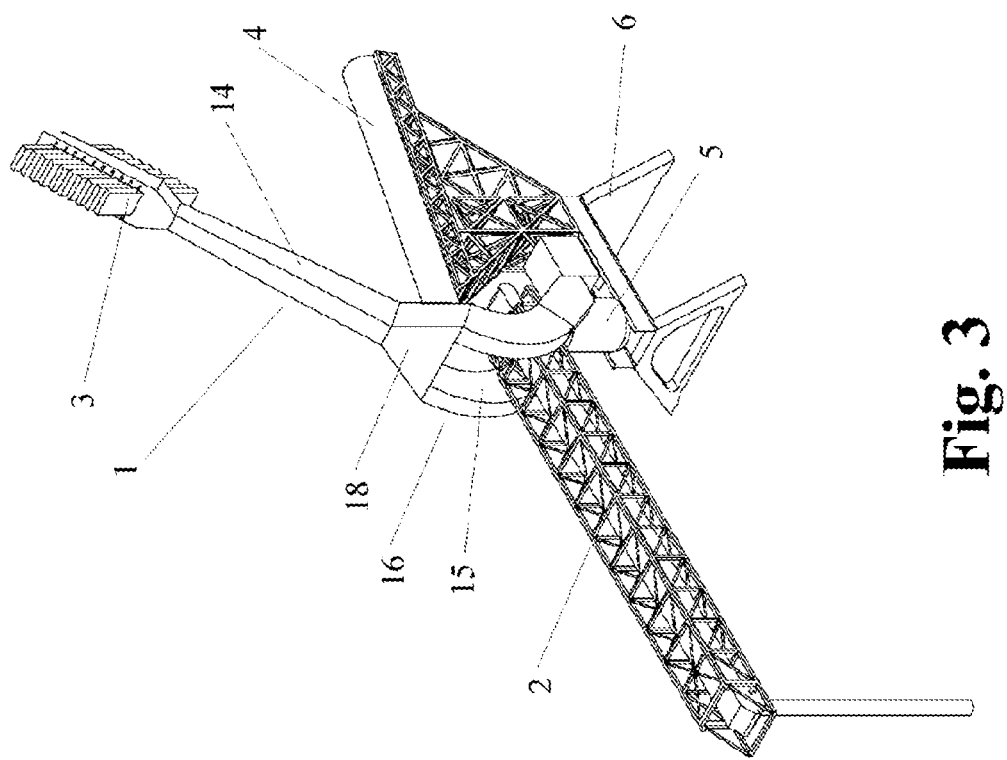

FIG. 3 shows a perspective view of the loading device or device for loading bulk goods shown in FIG. 2 with the pylon 1 according to the invention. The jib 2 is arranged within the forked structure of the pylon 1. The jib 2 can be vertically adjustable or tiltable. For example, a cable winch or another lifting device (not shown) can be provided for this purpose.

The invention further comprises a mobile or stationary unloader having the pylon 1 according to the invention as described above.

The invention further comprises a stacker or a transshipment device having the pylon 1 according to the invention. Moreover, the disclosure also includes a crane having the pylon 1 described above. In addition to bulk goods, other loads can also be loaded or transported with any device for loading loads having the pylon 1 described above. Railroad cars or trucks can also be loaded in addition to ships.

LIST OF REFERENCE SIGNS

1 Pylon
2 Jib
3 Counterweight
4 Product supply
5 Platform
6 Gantry
7 Base point
8 Vertical axis
10 Vertical member
11 Horizontal member
12 Counterweight
13 Guy
14 Central middle piece
15 Legs
16 Fork
17 Center of gravity
18 Connecting bar
a Angle of inclination

The invention claimed is:

1. A loading device comprising:
a gantry;
a platform which is mounted on the gantry;
a pylon, wherein the pylon is arranged at and connected to a base point on the platform;
at least one counterweight is mounted on the pylon on the section remote from the base point;
a jib which extends out from the pylon;
wherein the platform defines a vertical axis which extends in a vertical direction and runs through the base point;
wherein the pylon is curved at least in a region adjoining the platform and intersects the vertical axis twice and forms an acute upward angle from the vertical axis.

2. The loading device according to claim 1, wherein the pylon comprises a fork, a central middle piece and counterweights, wherein the fork is formed by two legs and a connecting bar, and the fork is curved.

3. The loading device according to claim 2, wherein the jib is arranged between the two legs of the pylon.

4. The loading device according to claim 1, wherein the jib is adjustable in height.

5. The loading device according to claim 1, wherein the angle is between 20° and 60°.

6. The loading device according to claim 1, wherein the center of gravity of the pylon is substantially above the base point or offset from the base point in a direction opposite the jib.

7. The loading device according to claim 1, wherein the pylon is curved in one direction.

8. The loading device according to claim 1, wherein the platform is rotatable about the vertical axis.

9. The loading device according to claim 1, wherein a section of the pylon remote from the base point is straight.

10. The loading device according to claim 1, wherein the pylon is curved over at least 10% to 50% of its longitudinal extent.

11. The loading device according to claim 1, wherein the pylon is formed from a box-shaped steel construction.

12. The loading device according to claim 1, wherein conveyor belts are provided on the loading device.

13. The loading device according to claim 1, wherein the loading device is a mobile or stationary unloader or loader for ships or a crane.

14. The loading device according to claim 1, wherein the pylon is arranged at and rotatably connected to the base point on the platform.

15. A pylon for a loading device,
- at least one counterweight mounted on the pylon on the section remote from a base point;
- wherein the pylon extends out from the base point of a platform and is at least partially curved,
- wherein the pylon is curved in such a way that it intersects a vertical axis twice and forms an acute upward angle from the vertical axis, and
- wherein the vertical axis extends through the base point of the platform in a vertical direction.

* * * * *